Figure 1:
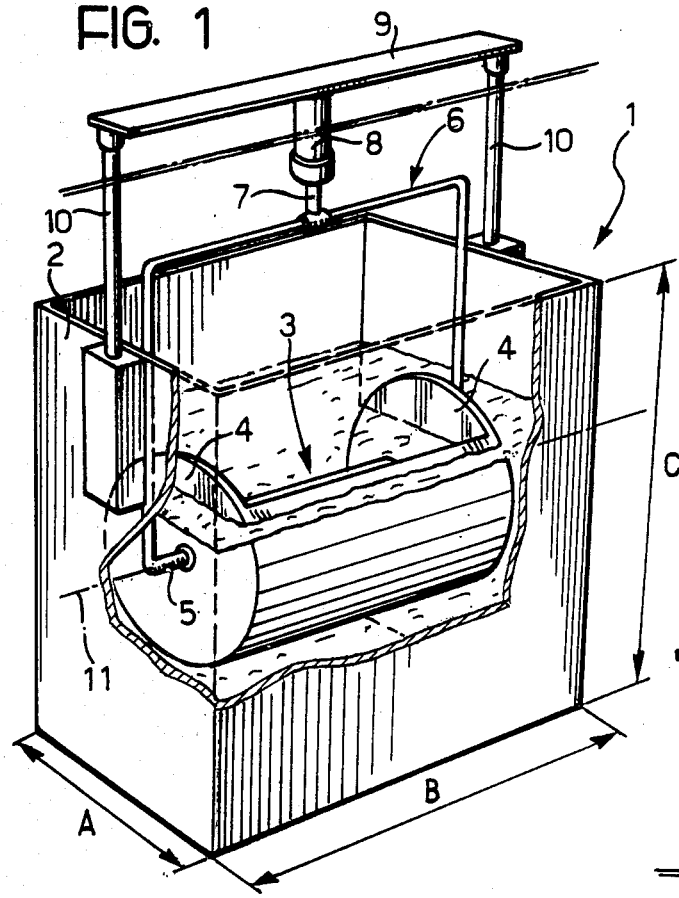

United States Patent [19]

Sbrizzai

[11] Patent Number: 4,499,725
[45] Date of Patent: Feb. 19, 1985

[54] HYDRAULIC MACHINE

[76] Inventor: Marino Sbrizzai, Via Parenzo 95, Torino, Italy

[21] Appl. No.: 509,191

[22] Filed: Jun. 29, 1983

[51] Int. Cl.³ .............................................. F03B 13/00
[52] U.S. Cl. ...................................... 60/506; 60/495; 60/497
[58] Field of Search ................. 60/495, 497, 502, 506; 417/337

[56] References Cited

U.S. PATENT DOCUMENTS 4,288,986 9/1981 Watson ............................ 60/497 X

FOREIGN PATENT DOCUMENTS 1250 1/1977 Japan ..................................... 60/495

Primary Examiner—Stephen F. Husar
Attorney, Agent, or Firm—Pearne, Gordon, Sessions, McCoy, Granger & Tilberry

[57] ABSTRACT

The hydraulic machine according to the invention comprises a reservoir intended to be filled with a fluid, a rotor freely rotatably supported about a horizontal axis within the reservoir, the rotor being so shaped that the center of buoyancy and resultant force or thrust to which the rotor is subject when immersed in the fluid is not located on the axis of rotation of the rotor, and means for causing a variation in the distance between the axis of rotation of the rotor and the free surface of the fluid within the reservoir, and/or for causing a variation in the volume of the fluid within the reservoir.

7 Claims, 11 Drawing Figures

U.S. Patent Feb. 19, 1985 Sheet 1 of 2 4,499,725

HYDRAULIC MACHINE

The present invention relates to hydraulic machines. The object of the present invention is to provide a hydraulic machine, comprising:

a reservoir filled with a fluid, a rotor freely rotatably supported about a horizontal axis within the reservoir, the rotor being so shaped that the centre of buoyancy and resultant force or thrust to which the rotor is subject when it is completely immersed in the fluid is not located on the axis of rotation of the rotor, and means for varying the distance between the axis of rotation of the rotor and the free surface of the fluid within the reservoir and/or for causing a variation in the volume of the fluid in the reservoir.

This rotor is intended to be connected through a mechanical transmission (for example, a reduction gear) to a load device such as an electrical generator.

The machine according to the present invention may also be used, to advantage, in the form of a model, as a teaching instrument for demonstrating the effects of Archimedean force.

In a preferred embodiment the said means are arranged to cause a variation in the quantity of fluid present in the reservoir and the latter is provided with an aperture in its bottom for the introduction and discharge of the fluid.

A further characteristic of the said preferred embodiment of the machine according to the invention lies in the fact that the inside surface of the reservoir is parallel to and adjacent the surface of the rotor.

By virtue of this characteristic it is possible to achieve considerable variations in the level of the free surface of the fluid within the reservoir, relatively small quantities of fluid being introduced into or removed from the reservoir.

According to a further characteristic, the rotor has a cylindrical body with a transverse section corresponding to part of a circle with its centre located on the axis of rotation of the rotor.

Preferably the said transverse section of the body of the rotor is asymmetrical with respect to any straight line passing through the said centre of rotation.

Figure 2:
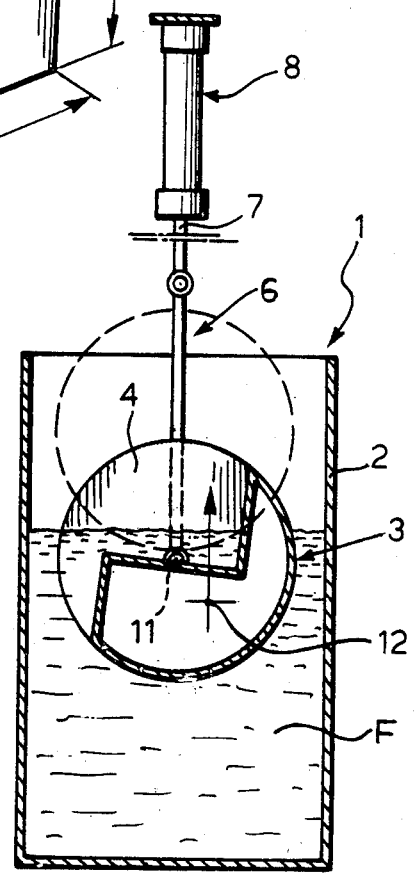
Figure 3:
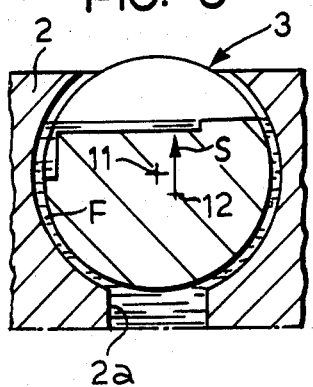
Figure 4:
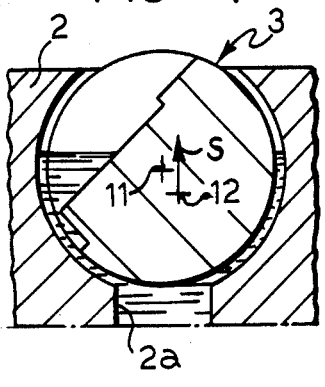
Figure 5:
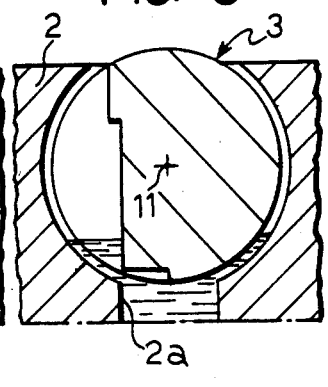
Figure 6:
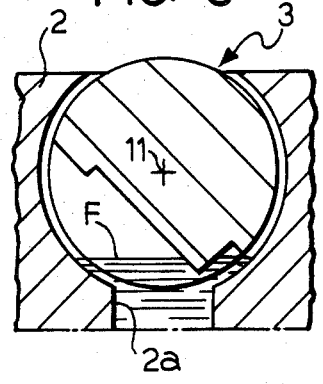
Figure 7:
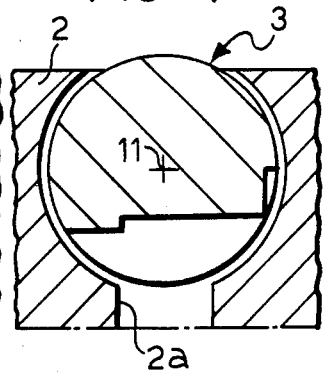
Figure 8:
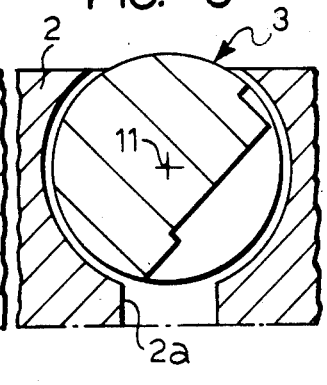
Figure 9:
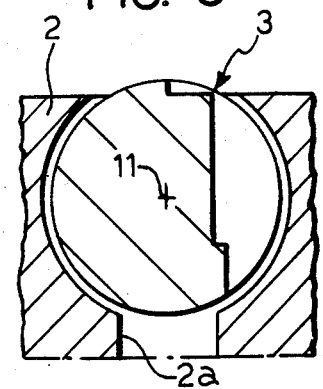
Figure 10:
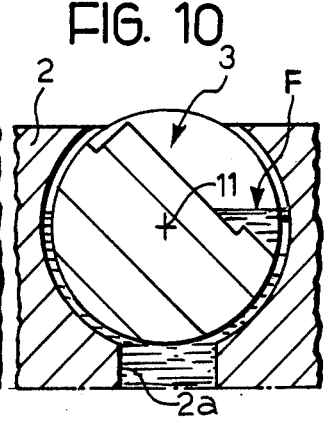
Figure 11:
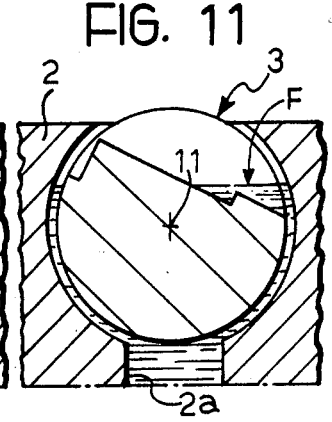

Further characteristics and advantages of the machine according to the present invention will emerge from the following description, with reference to the appended drawings, provided purely by way of non-limiting example, in which:

FIG. 1 is a perspective view of a model of the machine according to the present invention which has been used as experimental apparatus, FIG. 2 is a side view of the machine of FIG. 1, and FIGS. 3 to 11 are schematic views illustrating the various stages of operation of the machine according to the present invention.

In FIGS. 1, 2 reference numeral 1 generally indicates a hydraulic machine comprising a reservoir 2 intended to be filled with a fluid F (see FIG. 2).

In the practical embodiment made by the applicant, the reservoir 2 is of parallelepiped shape with a width A of 14.5 cm, a length of 24 cm and a height C of 24.5 cm.

However, as will emerge from the description which follows, the shape and dimensions of the reservoir are irrelevant to the characteristics of operation of the machine according to the invention.

Within the reservoir 2 there is disposed a rotor 3 constituted by a hollow cylindrical body having two circular end walls 4. The rotor 3 is freely rotatably mounted on a shaft 5 forming part of a frame 6 which is connected to the rod 7 of an actuator cylinder 8. The body of the actuator cylinder 8 is fixed to a beam 9 the ends of which are supported by two pillars 10 the lower ends of which are fixed to the walls of the reservoir 2.

As illustrated in FIG. 2, the rotor 3 is constituted by a hollow cylindrical body the transverse section of which corresponds to a part of a circle having its centre located on the axis of rotation of the rotor, which is indicated 11. The diameter of this circle corresponds to that of the circular end plates 4 of the rotor 3.

In an alternative construction, the rotational support of the rotor 3 is achieved by means of two lugs of the frame 6 which support solely the circular end plates 4, instead of by means of the shaft traversing the rotor axially over its entire length.

With reference to FIG. 2, the transverse section of the rotor body is so shaped that, when the rotor is immersed in the fluid F, the centre of buoyancy and the resultant force or thrust to which the rotor is subjected by the fluid is not located on the axis of rotation 11.

In the case, for example, in which the rotor 3 is completely submerged in the liquid F in the position illustrated in FIG. 2, the buoyancy and resultant force or thrust produced by the liquid on the rotor would be located at the point indicated 12. Clearly the position of the rotor illustrated in FIG. 2 would not then be a position of equilibrium. The thrust exerted by the fluid on the rotor corresponds in fact to the application of a torque on the rotor itself which causes it to rotate (in an anticlockwise sense with reference to FIG. 2). If the distance between the free surface of the liquid F contained in the reservoir 2 and the axis of rotation 11 remains constant the rotation continues until a position of equilibrium is reached.

Experiments carried out by the applicant with apparatus of the type illustrated in FIGS. 1, 2, in which the rotor 3 had a diameter of 22 cm, an axial length of 7 cm and a mass of 600 g have shown that the rotation effected by the rotor 3 from the position illustrated in FIG. 2 until it reaches the condition of equilibrium is about equal to 180°.

If one wishes to prevent the rotor from stopping in the equilibrium condition and to obtain continuous rotation of the rotor it suffices, during the rotation imparted by the fluid to the rotor, to drive the actuator cylinder 8 so as to raise the axis of rotation 11. This allows the rotor 3 to pass the said equilibrium condition due to inertia, in that it emerges almost totally from the fluid. Immediately the rotor 3 has returned so as to be close to the position illustrated in FIG. 2, the actuator cylinder 8 must be driven so as to lower the axis of rotation 11 to the condition illustrated in FIG. 2, so as to make use of the thrust of the liquid F to cause a continuation of the rotation of the rotor. In FIG. 2 the aforementioned raised position of the rotor is shown in broken outline.

Experiments carried out by the applicant have shown that if one starts from the condition illustrated in FIG. 2, with the axis of rotation 11 disposed about 2 cm below the free surface of the liquid, and if one raises the axis of rotation 11 by 6 cm after the rotor has effected an angular rotation through about 90° from the position illustrated in FIG. 2, and finally one lowers the axis of rotation 11 into the initial position immediately before the return of the rotor 3 to the position illustrated in FIG. 2, one achieves continuous rotation of the rotor 3 in the anticlockwise sense (with reference to FIG. 2) at an average rate of about 1 revolution per second.

The said experiments have also shown that the velocity of rotation is greater the greater the vertical distance through which the axis of rotation 11 is moved and the greater the angle of rotation of the rotor from the position illustrated in FIG. 2 at which the raising of the axis of rotation 11 is effected. Experiments have also shown that the volume and the shape of the receptacle do not matter.

The apparatus illustrated in FIGS. 1, 2 could be used, to advantage, as a teaching instrument for demonstrating the effects of Archimedean force.

FIGS. 3 to 11 illustrate schematically the various stages of operation of a preferred embodiment of the machine according to the invention which can be used industrially.

In the machine illustrated in these Figures the axis of rotation 11 of the rotor is fixed and the variation in the distance between the axis of rotation and the free surface of the liquid is achieved by varying the quantity of liquid within the reservoir. To this end the reservoir 2 has an aperture 2a in the bottom for the delivery and discharge of the liquid F.

A further characteristic of the machine illustrated in FIGS. 3 to 11 lies in the fact that the internal surface of the reservoir is parallel to and adjacent the surface of the rotor 3. By virtue of this characteristic it is possible to achieve relatively high variations in the level of the liquid in the reservoir while displacing relatively small quantities of liquid.

FIGS. 3 to 11 illustrate the rotor 3 in its various angular positions and the corresponding positions of the centre 12 of the buoyancy thrust applied by the liquid to the rotor.

The transverse section of the rotor of the machine illustrated in FIGS. 3 to 11 is different from that illustrated in FIGS. 1, 2. This section is also so shaped that, in the condition illustrated for example in FIG. 3, the centre of buoyancy and resultant force or thrust 12 is not located on the axis of rotation 11. The thrust exerted by the liquid on the rotor, indicated by the vector S in the drawings, thus causes the rotor to rotate in an anticlockwise sense (with reference to the drawings). FIGS. 4 to 11 illustrate the various positions of the rotor corresponding to a rotation of the rotor itself from the position of FIG. 3 through respective angles of: 45°, 90°, 135°, 180°, 225°, 270°, 315°, 330°.

At an angle of rotation of about 150° (position intermediate those illustrated in FIGS. 6, 7) liquid F is made to flow out of the reservoir so as to leave the rotor out of the liquid. The introduction of liquid into the reservoir is effected at an angle of rotation of about 300° (position intermediate those illustrated in FIGS. 9, 10).

In one example of application the shaft of rotation of the rotor is connected through a reduction gear to an electrical generator.

The utilization of a hydraulic press (essentially two intercommunicating vessels of different cross section) to control the quantity of liquid present within the reservoir allows relatively high quantities of liquid to be moved with relatively low forces.

Naturally, the principle of the invention remaining the same, constructional details and embodiments may be varied widely with respect to that described and illustrated purely by way of example, without thereby departing from the scope of the present invention.

I claim:

1. A hydraulic machine, comprising
   a reservoir filled with a fluid,
   a rotor freely rotatably supported about a horizontal axis within the reservoir, the rotor being so shaped that the centre of buoyancy and resultant force to which the rotor is subject when it is completely immersed in the fluid is not located on the axis of rotation of the rotor, and
   means for causing a variation in the volume of the fluid within the reservoir.

2. A hydraulic machine according to claim 1, wherein the said means are arranged to cause a variation in the quantity of fluid present in the reservoir and the reservoir has an aperture in the bottom for the delivery and discharge of the fluid.

3. A hydraulic machine according to claim 1, wherein the said means are arranged to cause a variation in the height of the axis of rotation of the rotor relative to the reservoir.

4. A hydraulic machine according to claim 2, wherein the internal surface of the reservoir is parallel to and adjacent the surface of the rotor.

5. A hydraulic machine according to claim 1, wherein the rotor has a cylindrical body with a transverse section corresponding to part of a circle with its centre located on the axis of rotation of the rotor.

6. A hydraulic machine comprising a reservoir filled with a fluid, a rotor freely rotatably supported about a horizontal axis within the reservoir, the rotor being so shaped that the centre of buoyancy and resultant force to which the rotor is subject when it is completely immersed in the fluid is not located on the axis of rotation of the rotor, and means for varying the distance between the axis of rotation of the rotor and the free surface of the fluid within the reservoir.

7. A hydraulic machine according to claim 6, wherein the rotor has a cylindrical body with a transverse section corresponding to part of a circle with its center located on the axis of rotation of the rotor.

* * * * *